Patented Aug. 28, 1934

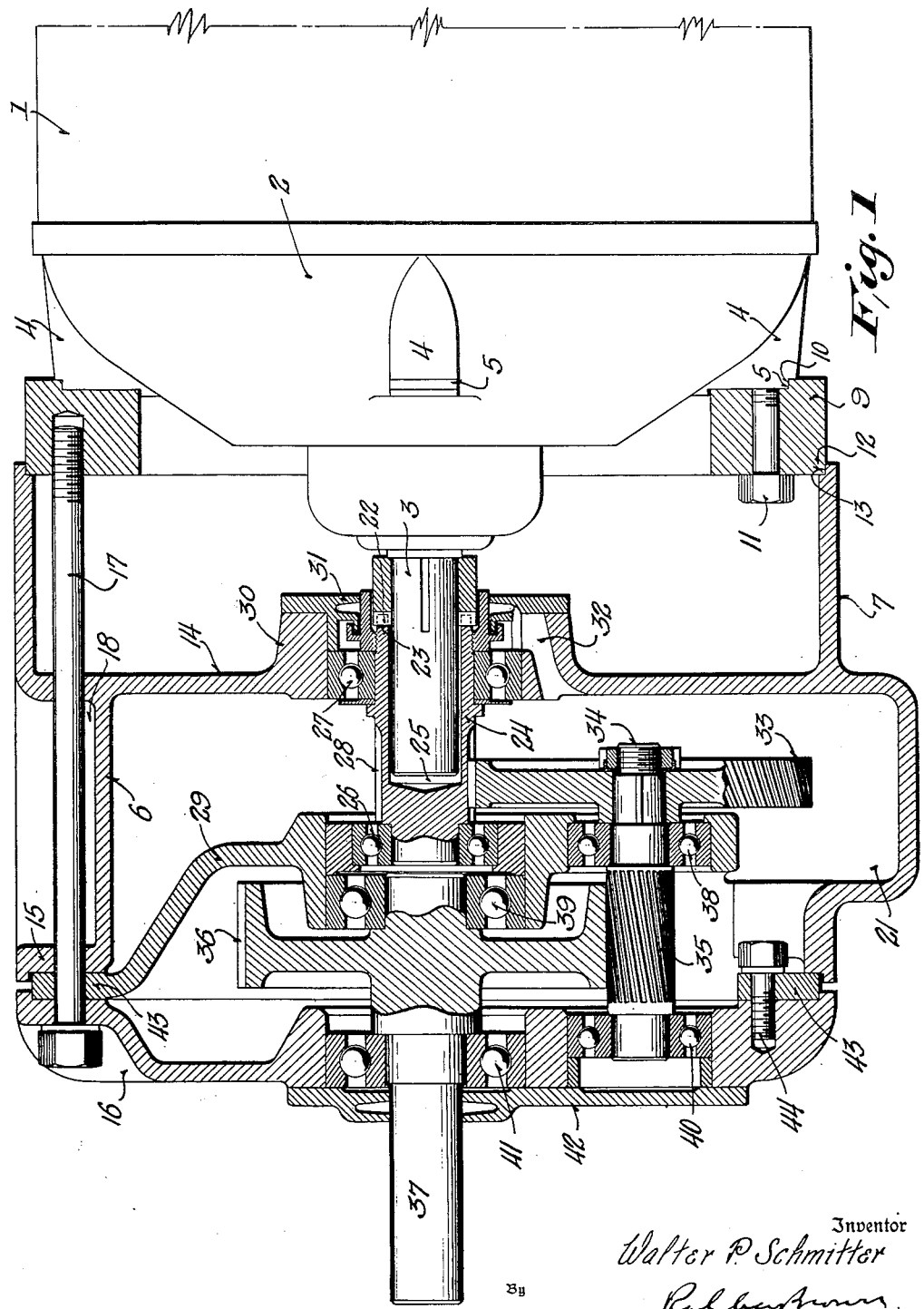

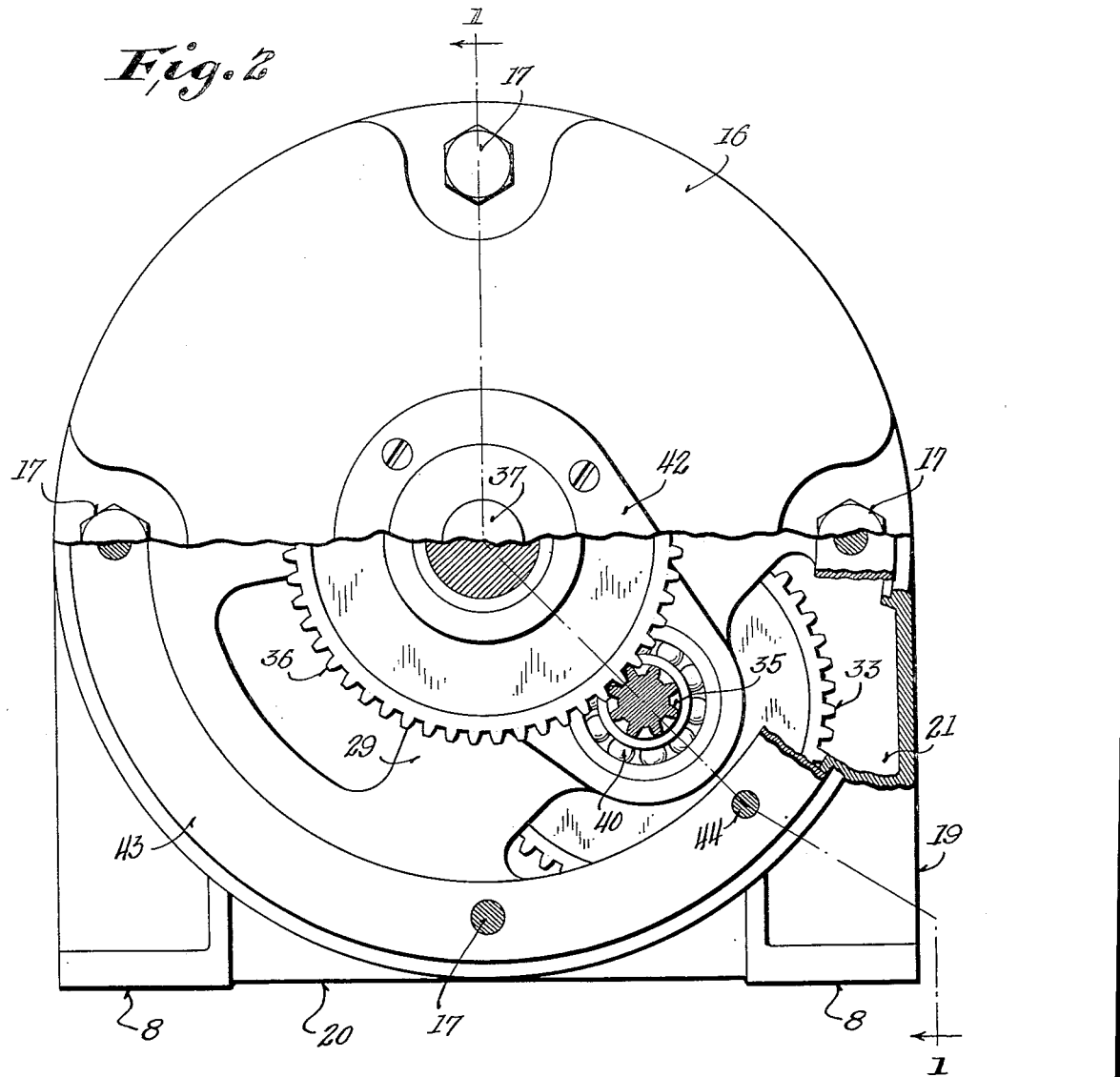

1,971,968

UNITED STATES PATENT OFFICE

1,971,968

GEARED MOTOR

Walter P. Schmitter, Milwaukee, Wis., assignor to The Falk Corporation, Milwaukee, Wis., a corporation of Wisconsin Application May 25, 1933, Serial No. 672,833

5 Claims. (Cl. 74—421)

This invention relates to geared electric motors.

In my copending application, Serial No. 620,879, filed July 5, 1932, I have disclosed geared motors each involving a gear housing which carries the motor and which encloses a gear set including a high speed pinion on the motor shaft. In the geared motors hereinafter described, the high speed pinion is supported in the housing independently of the motor. All of them include new features, some of which are hereinafter claimed and others of which are claimed in the application above identified.

Other objects and advantages will appear, expressed or implied, from the following description of a geared motor embodying the present invention.

In the accompanying drawings:

Fig. 1 is a sectional view of a reduction gearing constructed in accordance with the present invention and showing the same structurally combined with a standard electric motor, the section being taken on the irregular line 1—1 of Fig. 2.

Fig. 2 is an end elevation partly in section of the device shown in Fig. 1.

The electric motor shown is of a standard commercial type having a stator 1 which is provided upon each end thereof with a removable end plate or bearing bracket 2 having a suitable bearing therein to support the rotor shaft 3.

The motor is shown with its shaft horizontal but it is of a type originally intended for vertical mounting upon a base or supporting ring (not shown) by four supporting lugs 4 which are carried by one of the bearing brackets 2 and provided with threaded holes into which bolts are threaded to fasten the motor to the base or supporting ring. The several lugs 4 are provided with arcuate centering faces 5 which ordinarily coact with the supporting ring to position the motor relatively thereto and thereby insure accurate shaft alignment.

In this instance, the faces 5 are utilized for positioning the motor and the reduction gearing relatively to each other and in particular for bringing the rotor shaft 3 and a shaft of the reduction gearing into accurate axial alignment.

The reduction gearing has its mechanism arranged within and carried by an oil-tight casing 6 which is provided upon its rear end with a cylindrical flange 7 for supporting the motor and upon its lower side or bottom with supporting bases or feet 8 which are arranged in pairs at the front and rear ends thereof and spaced from each other.

The casing 6 and the motor are connected to each other by means of an adapter ring 9 which has its rear face abutting the front ends of the lugs 4 and provided with an annular shoulder 10 to engage the centering faces 5 and position the ring 9 concentric with the shaft 3. The ring 9 is fastened in position by bolts 11, which extend therethrough and are threaded into the holes provided in the lugs 4 by the motor manufacturer. The outer corner 12 of the ring 9 is fitted in an annular groove 13 which is formed within the rear end of the cylindrical flange 7 to position the ring 9 concentric to the casing 6. The ring 9 thus positively positions the motor and enables the casing 6 to support it from the feet 8 without danger of radial displacement.

The casing 6 is closed at its rear by a wall 14 and is provided at its front end with an external annular flange 15 to support a removable front head 16 which closes the front end of the casing and assists in supporting the reduction gear mechanism.

The front head 16 is fastened to the flange 15 and the motor is fastened to the casing 6 by elongated bolts 17 which extend through the head 16 and the flange 15 and are threaded into the adapter ring 9. The bolts 17 are ordinarily arranged in external pockets 18 in order to avoid the possibility of oil from within the casing 6 leaking through the bolt holes.

The casing 6 is cylindrical at its front and rear ends and the part thereof between the feet 8 is semi-cylindrical in its upper portion and provided with vertical side walls 19 which merge into a substantially flat bottom 20 and form therewith pockets 21 which enable the casing to enclose gearing having a higher gear ratio than would be possible if the casing was cylindrical throughout its length. By thus utilizing the spaces between the feet 8 which are ordinarily wasted, the pockets 21 do not add to the space occupied by the casing.

The reduction gearing is driven from the motor through a flexible jaw coupling, which in this instance comprises a sleeve 22 keyed upon the shaft 3 and having lugs 23 loosely engaged in recesses formed in the rear end of a shaft 24. The shaft 24 has an axial bore 25 formed therein of a size to freely accommodate the projecting end of shaft 3 and thereby reduce to a minimum the overall length of the motor and its gearing. The bore 25 is larger in diameter than the shaft 3 and the coupling 23 permits sufficient play between the shafts 3 and 24 to compensate for slight manufacturing errors and resultant slight misalignment of the shafts 3 and 24.

By thus keying the coupling part 22 upon the shaft 3, inserting the end of the shaft 3 into the bore 25 and attaching the adapter ring 9 to the lugs 4, the reduction gearing and its casing may be assembled with the motor without requiring any alteration of the motor; and motors of other sizes may be thus combined with the gearing by the selection and use of a properly proportioned adapter ring 9.

The driving shaft 24 is adequately supported independently of the motor shaft 3. In this instance it is journalled at its ends in anti-friction bearings 26 and 27 and is provided intermediate these bearings with a pinion 28 which is shown formed integral therewith. The bearing 26 is carried by a bearing support 29 and the bearing 27 is arranged within a hub 30 which is formed in the rear wall 14 and provided at its rear end with an oil seal 31. Oil which passes through the bearing 27 is prevented by the oil seal 31 from following the shafts 24 and 3 out of the casing 6 and is returned to the interior of the casing through a duct 32 formed in the lower part of the hub 30.

The driving pinion 28 meshes with a larger intermediate gear 33 which is arranged upon the rear end of a countershaft 34 having an intermediate pinion 35 arranged intermediate the ends thereof and preferably formed integral therewith. The pinion 35 meshes with a large driven gear 36 arranged upon a driven shaft 37 which is coaxial with the driving shaft 24 and projects through the front head 16 for the delivery of power from the motor to a driven machine or apparatus.

The countershaft 34 is arranged below and at one side of the shafts 24 and 37 and the gear 33 projects into one of the pockets 21 which enables the countershaft 34 to be spaced a greater distance from the shafts 24 and 37 than would be possible if the casing 6 was cylindrical throughout its length, thereby providing a higher gear ratio than would otherwise be possible.

The shafts 34 and 37 are supported, respectively, at the rear ends thereof in bearings 38 and 39, carried by the bearing support 29, and at the front ends thereof in bearings 40 and 41 carried by the front head 16 and arranged in suitable openings therein which are closed at the front by a cover plate 42.

The bearing support 29 is provided with an integral peripheral flange or ring 43 which extends forwardly from the plane of the bearings 26 and 38 and is rigidly clamped by the bolts 17 between the front head 16 and the flange 15 to form an oil tight joint therewith. The ring 43 is also preferably secured to the front head 16 by screws 44 so that, when the bolts 17 are removed, the bearing support 29, shafts 34 and 37 and associated mechanism may be removed as a unit from the casing 6.

The several pinions and gears are preferably of the single helical type but with the helix angles thereof so chosen as to relieve the countershaft bearings 38 and 40 of any material end thrust load. That is, the helix angle of the gear 33, which carries the lesser tooth load, is in the same direction but somewhat greater than the helix angle of the pinion 35, which carries the greater tooth load, so that the end thrust imposed on the shaft 34 by gear 33 is substantially equal but opposite to the end thrust imposed by the pinion 35.

Various changes may be made in the embodiment of the invention herein specifically described without departing from or sacrificing the advantages of the invention as defined by the following claims.

I claim:—

1. In a device of the character described the combination of a casing having a supporting base, and also having a removable end bell and a stationary wall at the opposite ends thereof, a driven shaft projecting through said end bell, a counter shaft, bearings in said end bell for supporting the forward ends of said shafts, a dished member attached to said end bell, bearings in said member for supporting the rear ends of said shafts, a hollow drive shaft journalled at one end in said member and at its other end in said end wall, gearing on said shafts for connecting the same in driving relation, a motor attached to and supported by said casing and having an independently supported shaft projecting into said drive shaft, and a separable coupling between said motor shaft and said drive shaft.

2. A reduction gearing for the purpose described comprising a casing having means at the rear thereof for receiving and supporting an electric motor, an end head releasably attached to the front of said casing, a driven shaft projecting through said head, a countershaft in said casing, forward bearings for said shafts carried by said head, a bearing support in said casing, rear bearings for said shafts carried by said support, intermeshing gears on said shafts between said forward and rear bearings, releasable means for securing said head and support to said casing and permitting removal thereof as a unit from said casing, and connections through which said countershaft is driven from the motor.

3. A reduction gearing for the purpose described comprising a casing having means at the rear thereof for receiving and supporting an electric motor, a removable end head normally closing the front of said casing, a driven shaft projecting through said head, a countershaft in said casing geared to said driven shaft, means cooperating with said end head to support said shafts in parallel relation, said last named means being connected with said end head for withdrawal therewith from said casing upon removal of said end head, and motor driven connections for driving said countershaft.

4. In a device of the character described the combination of a substantially cylindrical housing, a driven shaft projecting therefrom, a countershaft in said housing geared to said driven shaft, said countershaft being disposed below and laterally at one side of said driven shaft, a driving gear on said counter shaft, mounting means for said housing including a pair of longitudinally spaced feet at each side of the bottom thereof, said housing having a bottom portion extended laterally into the space between the pair of feet at one side thereof, said extended portion forming a pocket to accommodate said driving gear thereby to permit an increased spacing and increased gear ratio between said shafts within a housing of minimum overall vertical and transverse dimensions, and means including a drive shaft in said housing for driving said driving gear.

5. In a device of the character described the combination of a substantially cylindrical housing, a driven shaft projecting therefrom, a countershaft in said housing geared to said driven shaft, said countershaft being disposed below and laterally at one side of said driven shaft, a driving gear on said countershaft, mounting means for said housing having bearing surfaces disposed in a plane substantially tangential to the bottom of said housing, the bottom of said housing having a portion extended laterally to form a pocket to accommodate said driving gear thereby to permit an increased spacing and increased gear ratio between said shafts within a housing of minimum overall vertical and horizontal dimensions, and means including a drive shaft for driving said driving gear.

WALTER P. SCHMITTER.